May 22, 1951 A. A. HUBER ET AL 2,554,462
STRAND GUARD FOR WHEELS
Filed April 25, 1947
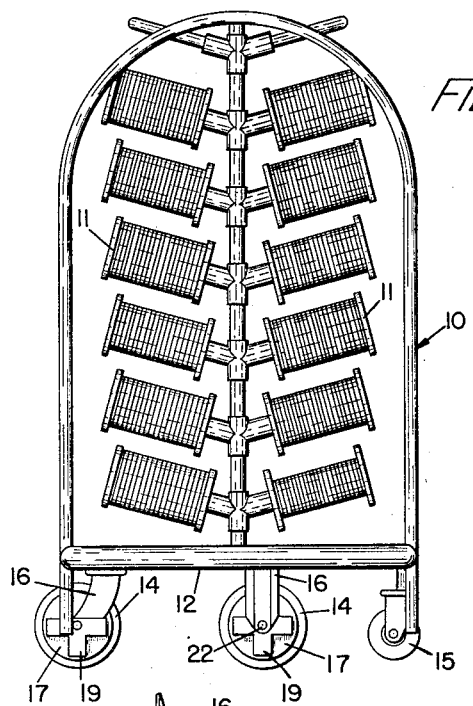
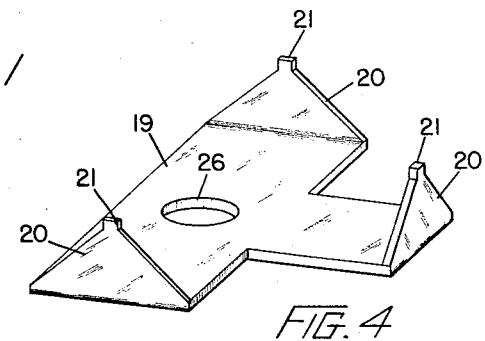
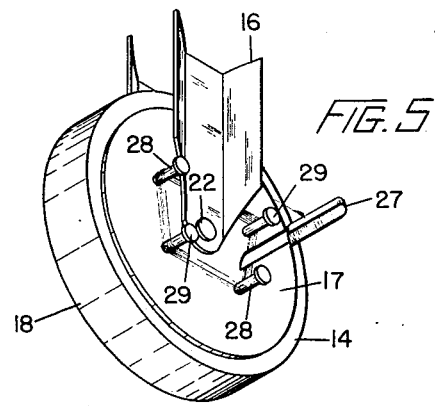
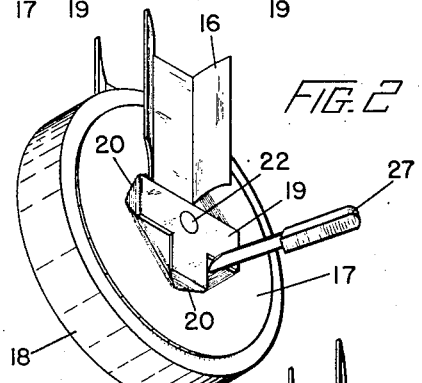
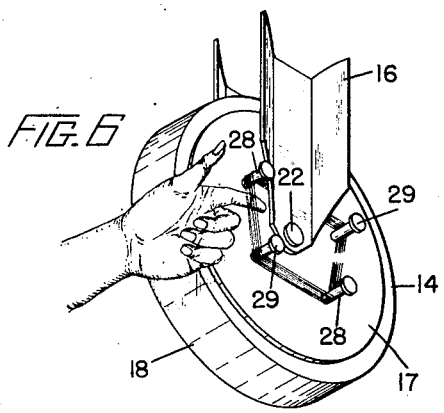
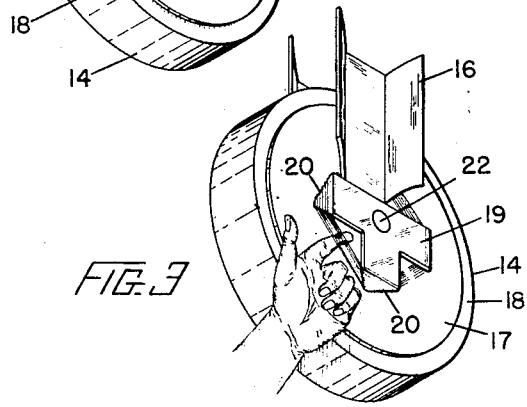
ALFRED A. HUBER &
KENNETH B. FREEMAN
INVENTORS
BY Frederick L. Binning
ATTORNEY Patented May 22, 1951

2,554,462

UNITED STATES PATENT OFFICE 2,554,462

STRAND GUARD FOR WHEELS

Alfred A. Huber, Painesville, and Kenneth B. Freeman, Mentor, Ohio, assignors to Industrial Rayon Corporation, Cleveland, Ohio, a corporation of Delaware Application April 25, 1947, Serial No. 743,930

3 Claims. (Cl. 16—18)

1

This invention relates to guards for wheels of handling trucks and the like. More particularly, the invention applies to a wheel protecting guard that is adapted to prevent for substantially long periods of time the binding of a truck wheel to its axle support or its axle by waste strand material found on the floors of textile manufacturing plants.

Strand material handling trucks, such as trucks that are adapted to carry bobbins or spools, or other types of wheeled conveyances that are utilized in textile manufacturing plants, very frequently become unuseable due to the binding of their wheels to the wheel axles or to the wheel supports by waste strand material. The binding occurs when strand material is picked up off the floor by the truck wheels and is then dropped between the wheel and its frame support, or between a wheel and its axle. The firmly wedged accumulated strand material will bind a wheel to its support or to its axle so effectively so as to render a truck useless. Such a truck, of course, must be stripped of the strand material. Not infrequently the strand material becomes packed hard around the axles and the wheels so that it cannot be removed without dismantling the truck wheels. Obviously, then, where a great number of handling trucks are utilized a proportionately large number of the trucks will become unuseable, and, of course, because of such conditions a larger inventory of trucks must be had than is normally required, as well as a substantial personnel force must be maintained for their upkeep.

This invention advantageously provides for a wheel guard that is adapted to substantially prevent strand material from binding the wheel to its axle, or to its axle support. The strands are desirably collected by the guard in, substantially, a skein form. The guard is advantageously positioned where it is most effective. It is placed about the axle and next to the wheel so that the waste material will readily wrap itself around it. Further, the guard permits a ready and an easy removal of the strand material without the necessity of taking off a wheel. Thus, as a result, the guard advantageously prolongs the usefulness of the handling trucks, and decreases their maintenance.

The wheel guard and its advantages will be explained in greater detail in the following specification and the accompanying drawing, where:

Figure 1 is a representation in side elevation of a bobbin truck having wheels which are equipped with the strand collecting wheel guard of this invention;

2

Figures 2 and 3 are enlarged representations of the guard shown on the bobbin truck;

Figure 4 is an enlarged modification of the strand collecting portion of the wheel guard; and Figures 5 and 6 represent a further modification of the wheel guard.

Bobbin trucks 10, such as shown in Figure 1, are generally utilized for the conveyance of a plurality of wound and unwound bobbins or spools 11 from one location to another in textile manufacture plants. Such trucks are usually equipped with three wheels 14 that bear all the truck weight, and a small swivel type guide wheel 15. The wheels 14 are commonly attached to the truck chassis 12 in a triangular manner, two of them being fixed at either side of the truck chassis while the third is positioned at the front and in the center of the truck chassis. The third or front central wheel 14 is made pivotable so as to act as a guide wheel. The wheels 14 are mounted on stationary axles 22 which are positioned in the supports 16. All of the weight of the truck is borne by the three wheels 14 which are always in contact with the floor. The fourth wheel 15 is very seldom in contact with the floor and merely serves as an occasional additional support for the truck, or as a guide wheel when the truck is pushed over an incline to a higher floor level. The center of gravity of the truck is desirably somewhere within the three wheels 14.

Inasmuch as wheels 14 of the truck are in continual contact with the floor they have the tendency when passing over waste strands of textile materials to pick up such strands and carry them around on the wheel. After being raised the strands tend to drop off the wheel to wedge themselves between the wheel support 16, which is attached to the truck frame 12, and the wheel 14, or about the axle 22. In due time a quantity of such material will accumulate so as to force a wheel shielding disc 17 against the wheel, or bind the wheel to the wheel axle 22 or to the wheel support 16, to prevent further rotation of the wheel, and thus to render the truck useless.

Disc plates 17 which form a part of the wheel guard fit against the wheels 14 and within the wheel tread 18. The discs are positioned about the stationary axle 22, and they are also supported thereby. Such disc plates or shields are not adapted, by themselves, to guard the wheels from binding. They do, however, deflect the strand material picked up by the wheels 14 to a collecting device 19. Without the strand collecting device 19 the strands would become packed between the support 16 and the disc 17 to eventually force the disc over against the wheel 14 to thus bind the wheel to the wheel support. To prevent the mass of strand material from wedging itself in a haphazard manner between the wheel disc and the support, there is advantageously mounted on the disc 17 and about the axle 22 the strand collecting device 19 which is adapted because of its structure to collect substantially all of the waste strand material in the form of a tightly wound skein.

As shown in Figure 2, the guard comprises the disc 17 and the strand collecting device 19. The device 19 is a three pronged T-shaped member 19, resembling a spider, which is adapted to be positioned in the wheel disc, and also about the wheel axle 22. The wheel disc 17 is held in a stationary manner by being fixedly mounted on the stationary axle 22. The ends 20 of the member 19 are tapered off in a triangular manner into rectangular points 21 which are adapted to be received by complementary recesses in the wheel disc 17. Further, the member 19 has an aperture 26 so that its can be mounted about the wheel axle 22. Since the strand collecting member 19 is mounted on the disc 17 and about the axle 22 it is also stationary. The only member of the assembly that its adapted to rotate is, of course, the wheel 14. Any strand material, then, that is picked up off the floor by the wheel 14 as the truck is moved tends to fall along the disc to become wound around the ends 20 of the member 19.

The strand collecting member 19 is advantageously constructed, as shown in Figure 4, so that the strand material will continually wind itself around its triangular projections 20. As the material is laid about the arms of the member 19 it tends to slide down over the tapered ends 20 toward the wheel disc to form a single solid accumulation which can be readily removed. The accumulation of strand material about the member 19 is usually in a bunched form resembling a skein which can be easily cut, as for instance, with a knife 27. The knife 27 can be readily inserted into the space formed by the arms of the member 19 and it then can be drawn outwardly to server the bunch of accumulated strands. After cutting, the bunch of strand material can be easily removed from the wheel by merely pulling it off of the guard, as shown in Figure 3. Although, only one side of a wheel is shown with the herein described guard, there is, of course, a similar guard on the other side of the wheel.

There is shown in Figures 5 and 6 a modification of the strand collecting member 19 of Figure 4. In lieu of a one piece T-shaped member a plurality of studs 28, four being shown, can be advantageously inserted into the wheel disc 17 at desirable points around the wheel axle 22. The studs 28 are provided with heads 29 in order to prevent the strand material from slipping off them. A lesser number, or a greater number, than the four studs shown can be utilized if so desired. The studs 28 may be held in the wheel disc 17 by being welded thereto, or riveted.

Furthermore, the studs can be attached to the disc 17 at an angle and thus avoid the use of heads 29. Strand material will collect around the protruding studs in the same manner as it did about the member 19. The material can also be removed from the studs in the same manner as had been described with reference to the member 19.

Thus, there is provided by this invention a wheel guard which is adapted to readily collect strand material that is raised off the floor by the wheels of a handling truck. The strand material is collected in a manner so as to make it easily removable without the necessity of disassembling the truck wheel assembly. Trucks in textile manufacturing plants are, as a result of such a guard, made useable for prolonged lengths of time; also their maintenance is minimized to a substantial degree.

We claim:

1. In combination, a wheel, a stationary axle supporting said wheel, disc shields of lesser diameter than said wheel mounted and fixed against rotation about the stationary axle, one on each side of the wheel and adjacent the wheel, and a strand-collecting means on said disc shields comprising a plurality of elements spaced about the axle and extending laterally from said axle and away from said shields, the spacing of the elements being such as to permit the entry of a severing device for severing strandular material raised by the rotation of said wheel.

2. The combination of claim 1 in which the strand collecting means on the disc shields comprises a plurality of spaced and radially extending arms along said shields having lateral projections at substantially right angles to said shields.

3. In combination, a wheel, a stationary shaft supporting said wheel, stationary discs having a lesser diameter than said wheel mounted about said shaft adjacent the wheel and within the wheel tread, a plurality of outwardly extending strand collecting members positioned on the discs and spaced about the wheel shaft so as to permit the entry of a strand severing device for severing accumulated strandular material raised by the rotation of the wheel, and said strandular material collecting members having enlarged end portions to prevent the strandular material from slipping off.

ALFRED A. HUBER.
KENNETH B. FREEMAN.

REFERENCES CITED

The following references are of record in the file of this patent:

UNITED STATES PATENTS

| Number | Name | Date |
|--------|------|------|
| 798,564 | Canedy | Aug. 29, 1905 |
| 1,153,838 | Bower et al. | Sept. 14, 1915 |
| 1,285,142 | Happensack | Nov. 19, 1918 |
| 1,432,966 | Chesnutt | Oct. 24, 1922 |